United States Patent
Koshi et al.

(10) Patent No.: US 6,349,861 B1
(45) Date of Patent: Feb. 26, 2002

(54) JET SOLDER FEEDING DEVICE AND SOLDERING METHOD

(75) Inventors: Masuo Koshi, Ikoma; Tadahiko Sugimoto, Kadoma; Takeshi Onobayashi, Osaka; Kenichirou Todoroki, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/577,368

(22) Filed: May 23, 2000

(30) Foreign Application Priority Data

May 27, 1999 (JP) .................................. 11-147386
Apr. 25, 2000 (JP) ...................................... 2000-123388

(51) Int. Cl.$^7$ ............................................. B22D 41/08
(52) U.S. Cl. ...................................... 222/594; 222/591
(58) Field of Search ............................. 222/590, 591, 222/595, 594

(56) References Cited

U.S. PATENT DOCUMENTS

| | | | |
|---|---|---|---|
| 4,410,126 A | * 10/1983 | O'Rourke | 228/180 R |
| 4,566,624 A | * 1/1986 | Comerford | 228/180.1 |
| 5,855,323 A | * 1/1999 | Yost et al. | 239/135 |
| 6,158,650 A | * 12/2000 | Holzmann | 228/248.1 |

* cited by examiner

Primary Examiner—Scott Kastler
(74) Attorney, Agent, or Firm—Parkhurst & Wendel, L.L.P

(57) ABSTRACT

To provide a jet solder feeding device enabling the prevention of poor wetting of a substrate and molten solder which may occur due to gas or air accumulated under the bottom surface of a substrate when the substrate is conveyed to the point where it is fed with molten solder. The jet solder feeding device is designed in such a manner that multiple ejecting ports are provided in more than one rows relative to the substrate-conveying direction and arranged at a second prescribed pitch in lines substantially along multiple inclined lines which are inclined to the substrate-conveying direction and arranged at a first prescribed pitch relative to the direction perpendicular to the substrate-conveying direction, the first prescribed pitch being set to be larger than the second prescribed pitch, so that a flow of molten solder passing through midway between groups of the ejecting ports is positively created.

11 Claims, 9 Drawing Sheets

UPSTREAM ROW | DOWNSTREAM ROW
INTERMEDIATE ROW

UPSTREAM ROW | DOWNSTREAM ROW
INTERMEDIATE ROW

JET SOLDER FEEDING DEVICE AND SOLDERING METHOD

FIELD OF THE INVENTION

This invention relates to a jet solder feeding device for feeding molten solder to a substrate by ejecting the molten solder from ejecting ports and to a method for soldering the same.

BACKGROUND OF THE INVENTION

Jet solder feeding devices are already known in which soldering is carried out for a substrate mounted with electronic parts by feeding molten solder ejected through jet nozzles to the substrate while letting the substrate be conveyed in a prescribed direction.

Jet solder feeding devices of this type include the one which comprises: a first jet nozzle 1 for feeding molten solder J satisfactorily to a substrate P mounted with electronic parts in the whole area of the surface to be soldered and a second jet nozzle 2 for removing excess molten solder J having been fed to the substrate P, as shown in FIGS. 6 and 7. The first jet nozzle 1 and the second jet nozzle 2 are connected to a duct 3 for the first nozzle and a duct 4 for the second nozzle, respectively, both of which are soaked in molten solder J accumulated in a solder melting bath 5. This jet solder feeding device is designed to eject molten solder J from the first jet nozzle 1 and the second jet nozzle 2 toward a substrate-conveying path 10 by rotationally driving impellers 6 and 7 arranged to face each of the openings at one end of the duct 3 and at one end of the duct 4, respectively.

On the upper end portion of the first jet nozzle 1, a corrugated plate 9 with multiple open ejecting ports 8 is mounted. The ejecting ports 8 are provided, for example, in three rows relative to the direction A in which the substrate P is conveyed, and all the ejecting ports 8 are formed at a prescribed pitch M relative to the direction B perpendicular to the direction A in which the substrate P is conveyed in such a manner that more than one ejecting ports 8 are in each row, as shown in FIGS. 8a, 8b. As for the direction B perpendicular to the substrate-conveying direction A, these ejecting ports 8 are staggered in a top view in such a manner that each ejecting port 8 in the row next to the first or second row is located right at a midpoint of the adjacent ejecting ports in the above first or second row which are lined up laterally along the direction B perpendicular to the substrate-conveying direction A.

In this jet solder feeding device, the substrate P is designed to improve wettability of solder in such a manner as to apply flux thereto before soldering.

In the above described conventional jet solder feeding device, however, molten solder J ejected from 4 adjacent ejecting ports 8, in a top view, flows right into the midpoint of the above 4 adjacent ejecting ports 8 while keeping a balanced relationship among the force and direction Fs of its flow, as shown in FIG. 9. Accordingly, when the substrate P is conveyed to a position facing each ejecting port 8 of the first jet nozzle 1 and comes in contact with the molten solder J, gas of vaporized flux or air Q or the like may accumulate in the midpoint of the 4 adjacent ejecting points 8 under the bottom surface of the substrate P. This causes poor wetting since there arise portions where the molten solder J does not come in contact with the substrate P.

The present invention has been made to solve the above problem. Accordingly, the object of the present invention is to provide a jet solder feeding device and a method for soldering which enable the prevention of poor wetting due to the accumulation of gas, air or the like under the bottom surface of the substrate caused when the substrate is conveyed to a position where it is fed with molten solder.

DISCLOSURE OF THE INVENTION

In order to solve the above problem, the present invention is a jet solder feeding device for feeding molting solder to a substrate conveyed in a prescribed conveying direction by ejecting the molten solder from multiple ejecting ports toward a the substrate, wherein, in at least one part of the area including the above multiple ejecting ports, the ejecting ports are provided in more than one rows relative to the substrate-conveying direction, including an upstream row and a downstream row and arranged at a second prescribed pitch in lines substantially along multiple inclined lines which are inclined to the substrate-conveying direction and, being arranged at a first prescribed pitch in the direction perpendicular to the substrate-conveying direction, the above first prescribed pitch being set to be larger than the above second prescribed pitch.

The jet solder feeding device having this configuration enables the prevention of poor wetting due to the accumulation of gas, air or the like under the bottom surface of the substrate caused when the substrate is conveyed to a position where it is fed with molten solder.

The invention in one embodiment is a jet solder feeding device for feeding molten solder to a substrate conveyed in a prescribed conveying direction by ejecting the molten solder from multiple ejecting ports toward the substrate, wherein, in at least one part of the area including the multiple ejecting ports, the ejecting ports are provided in more than one rows relative to the substrate-conveying direction, including an upstream row and a downstream row and arranged at a second prescribed pitch in lines substantially along multiple inclined lines which are inclined to the substrate-conveying direction, and being arranged at a first prescribed pitch in the direction perpendicular to the substrate-conveying direction, the above first prescribed pitch being set to be larger than the above second prescribed pitch.

According to this configuration, since the first prescribed pitch is larger than the second prescribed pitch, the balance of the flowing force of molten solder from each ejecting port is lost between the midpoint of adjacent ejecting ports arranged at the first prescribed pitch and the midpoint of adjacent ejecting ports arranged at the second prescribed pitch. As a result, molten solder flows from the point where its flowing force is larger to the point where its flowing force is smaller. Accordingly, the flow of molten solder passing through midway between adjacent groups of ejecting ports is created positively; therefore when the substrate is conveyed to the position where it is fed with molten solder, even if gas of vaporized flux is generated or air is admixed, the gas generated or the air admixed under the bottom surface of the substrate is satisfactorily discharged along the above described flow to the outside. This means no occurrence of poor wetting.

The invention in another embodiment is a jet solder feeding device for feeding molten solder to a substrate conveyed in a prescribed conveying direction by ejecting the molten solder from multiple ejecting ports toward the substrate, wherein, in at least one part of the area including the above multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch in the direction perpendicular to the substrate-conveying direction, said ejecting ports further being arranged in such a manner that overlap dimensions relative to the direction perpendicular to the substrate-conveying direction of an ejecting port in the most upstream row and an ejecting port in the most downstream row of adjacent groups of ejecting ports are smaller than overlap dimensions relative to the direction perpendicular to the substrate-conveying direction of the adjacent ejecting ports of one group of ejecting ports arranged along the same inclined line.

The invention in another embodiment is a jet solder feeding device for feeding molten solder to a substrate conveyed in a prescribed conveying direction by ejecting molten solder from multiple ejecting ports toward the substrate, wherein, in at least one part of the area including the above multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch in the direction perpendicular to the substrate-conveying direction, said ejecting ports further being arranged in such a manner that an ejecting port in the most upstream row and an ejecting port in the most downstream row of adjacent groups of ejecting ports do not overlap each other relative to the direction perpendicular to the substrate-conveying direction.

According to these configuration, the spacing between the adjacent groups of ejecting ports is larger than the spacing between the adjacent ejecting ports of one group of ejecting ports, and the balance of the flowing force of molten solder from each ejecting port is lost between the midpoint of the adjacent groups of ejecting ports and the midpoint of the adjacent ejecting ports of a group of ejecting ports. As a result, molten solder flows from the point where its flowing force is larger to the point where its flowing force is smaller. Accordingly, the flow of molten solder passing through midway between the adjacent groups of ejecting ports is created positively; therefore when the substrate is conveyed to the position where it is fed with molten solder, even if gas of vaporized flux is generated or air is admixed, the gas generated or the air admixed under the bottom surface of the substrate is satisfactorily discharged along the above described flow to the outside. This means no occurrence of poor wetting.

The invention in another embodiment is a jet solder feeding device including a first jet nozzle for feeding molten solder to the substrate and a second jet nozzle for removing excess solder from the substrate having been fed with solder, in this jet solder feeding device the ejecting ports are provided on the first jet nozzle.

According to this configuration, molten solder can be satisfactorily fed from the multiple ejecting ports provided on a first jet nozzle to a substrate.

The invention in another embodiment is a jet solder feeding device in which the portion provided with more than one rows of ejecting ports is arranged horizontally to the substrate-conveying direction.

The invention in another embodiment is a jet solder feeding device in which the portion provided with more than one rows of ejecting ports is inclined relative to the substrate-conveying direction in an upgrade manner toward the downstream side of the above direction.

According to this configuration, since molten solder ejected from the ejecting ports flows down toward the upstream side of the incline by self-weight, the relative speed between a substrate and molten solder is enhanced. This promotes wetting of the substrate and molten solder, in addition, even if gas of vaporized flux is generated or air is admixed, the gas generated or the air admized under the bottom surface of the substrate is satisfactorily discharged to the upstream side of the substrate-conveying direction.

The invention in another embodiment is a jet solder feeding device in which a substrate is conveyed in a prescribed upgrade substrate-conveying direction, the portion provided with more than one rows of ejecting ports is inclined relative to the substrate-conveying direction in an upgrade manner toward the downstream side of the above direction, and each ejecting port has a smaller bore diameter according as it is located nearer to the downstream side of the substrate-conveying direction.

According to this configuration, since the bore diameter of each ejecting port is set in such a manner that the ejecting ports located nearer to the downstream side of the substrate-conveying direction have a smaller bore diameter, the flow width of the molten solder ejected from the ejecting ports located in a row nearer to the downstream side of the substrate-conveying direction becomes smaller. Accordingly, when the molten solder ejected from ejecting ports located nearer to the downstream side of the substrate-conveying direction flows down along a corrugated plate, leveling of piles of the molten solder ejected from the ejecting ports located nearer to the upstream side of the substrate-conveying direction can be held to a minimum. In addition, since the ejecting ports located nearer to the upstream side of the substrate-conveying direction have a larger diameter, the piles of the molten solder ejected from such ejecting ports can be kept at a required height around each of their center portion.

The invention in another embodiment is a jet solder feeding device in which the jet solder feeding device comprises a corrugated plate, multiple ejecting ports being formed thereon, each of the ejecting ports on the corrugated plate being surrounded by a wall portion projecting upward.

According to this configuration, molten solder ejected from each eject port can be kept at a desired height stably.

The invention in another embodiment is a method for soldering a substrate conveyed in a prescribed conveying direction by ejecting molten solder from multiple ejecting ports toward the substrate to feed the molten solder thereto, in which, in at least one part of the area including the above multiple ejecting ports, the ejecting ports are provided in more than one rows relative to the substrate-conveying direction, including an upstream row and a downstream row and arranged at a second prescribed pitch in lines substantially along multiple inclined lines which are inclined to the substrate-conveying direction, and being arranged at a first prescribed pitch relative to the direction perpendicular to the substrate-conveying direction, the above first prescribed pitch being set to be larger than the above second prescribed pitch, whereby soldering is carried out for the portion to be connected arranged on the substrate with the molten solder ejected from the above multiple ejecting ports.

According this method, since the first prescribed pitch is larger than the second prescribed pitch, the balance of the flowing force of molten solder from each ejecting port is lost between the midpoint of the adjacent ejecting ports arranged at the first prescribed pitch and the midpoint of the adjacent ejecting ports arranged at the second prescribed pitch. As a result, molten solder flows from the point where its flowing force is larger to the point where its flowing force is smaller. Accordingly, the flow of molten solder passing through midway between the adjacent groups of ejecting ports is created positively; therefore when the substrate is conveyed to the position where it is fed with molten solder, even if gas of vaporized flux is generated or air is admixed, the gas generated or the air admixed under the bottom surface of the substrate is satisfactorily discharged along the above described flow to the outside. This means no occurrence of poor wetting.

The invention in another embodiment is a method for soldering a substrate conveyed in a prescribed conveying direction by ejecting molten solder from multiple ejecting ports toward the substrate to feed the molten solder thereto, in which, in at least one part of the area including the above multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch relative to the direction perpendicular to the substrate-conveying direction, said ejecting ports further being arranged in such a manner that overlap dimensions relative to the direction perpendicular to the substrate-conveying direction of an ejecting port in the most upstream row and an ejecting port in the most downstream row of adjacent groups of ejecting ports are smaller than overlap dimensions relative to the direction perpendicular to the substrate-conveying direction of adjacent ejecting ports of a group of ejecting ports arranged along the same inclined line, whereby soldering is carried out for the portion to be connected arranged on the substrate with the molten solder ejected from the above multiple ejecting ports.

The invention in another embodiment is a method for soldering a substrate conveyed in a prescribed conveying direction by ejecting molten solder from multiple ejecting ports toward the substrate to feed the molten solder thereto, in which, in at least one part of the area including the above multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch relative to the direction perpendicular to the substrate-conveying direction, said ejecting ports further being arranged in such a manner that an ejecting port in the most upstream row and an ejecting port in the most downstream row of the adjacent groups of ejecting ports do not overlap each other relative to the direction perpendicular to the substrate-conveying direction, whereby soldering is carried out for the portion to be connected arranged on the substrate with the molten solder ejected from the above multiple ejecting ports.

According to these methods of claims 10 and 11, the spacing between the adjacent groups of ejecting ports is larger than the spacing between the adjacent ejecting ports of a group of ejecting ports, and the balance of the flowing force of molten solder from each ejecting port is lost between the midpoint of the adjacent groups of ejecting ports and the midpoint of the adjacent ejecting ports of a group of ejecting ports. As a result, molten solder flows from the point where its flowing force is larger to the point where its flowing force is smaller. Accordingly, the flow of molten solder passing through midway between the adjacent groups of ejecting ports is created positively; therefore when the substrate is conveyed to the position where it is fed with molten solder, even if gas of vaporized flux is generated or air is admixed, the gas generated or the air admixed under the bottom surface of the substrate is satisfactorily discharged along the above described flow to the outside. This means no occurrence of poor wetting.

DESCRIPTION OF THE EMBODIMENTS

The embodiments of this invention will be described with reference to FIGS. 1–5.

Figure 1:
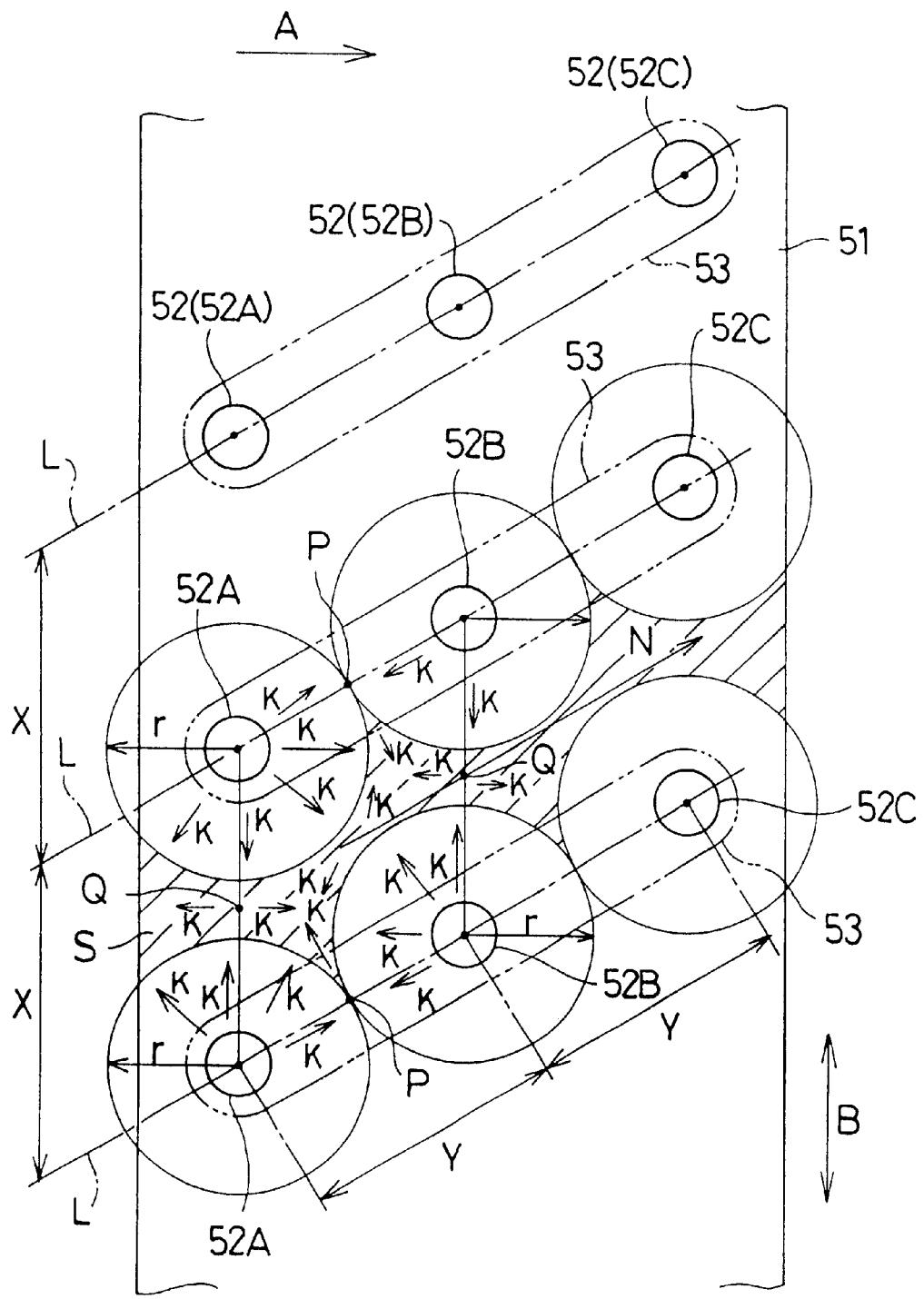
FIG. 1 is a top view partly broken away to show the main part of a jet solder feeding device according to a first embodiment of the present invention.

Referring first to FIG. 1, there is shown a top view, partly broken away, of the main part of a jet solder feeding device according to a first embodiment of the present invention, the jet solder feeding device including a corrugated plate 51 mounted on the upper end portion of a first jet nozzle 1 which has multiple ejecting ports 52 formed thereon. A substrate P is conveyed in the horizontal direction and the corrugated plate 51 with ejecting ports 52 formed thereon is arranged horizontally to the direction A in which the substrate P is conveyed.

These ejecting ports 52 are arranged in three rows relative to the direction A in which the substrate P is conveyed: an upstream row of ejecting ports 52A, an intermediate row of ejecting ports 52B and a downstream row of ejecting ports 52C. The ejecting ports 52A, 52B and 52C are arranged in lines along multiple inclined lines L which are inclined at a prescribed angle to the substrate-conveying direction A and arranged at a first prescribed pitch X relative to the direction B perpendicular to the substrate-conveying direction A, and are also arranged at a second prescribed pitch Y along each of the inclined lines L, the first prescribed pitch X being set to be larger than the second prescribed pitch Y. The bore diameters of each ejecting port 52A, 52B or 52C are all the same and the flow forces of the molten solder J from each ejecting port 52A, 52B or 52C are all the same, too.

The flow of molten solder J ejected from each ejecting port 52 (52A, 52B, 52C) in the above described configuration will be described with reference to FIG. 1.

In the above configuration, let P denote the midpoint of the ejecting ports 52A in the upstream row and 52B in the intermediate row of each group 53 of ejecting ports along the same inclined line L, and let Q denote the midpoint of the two adjacent ejecting ports 52A in the upstream row of the adjacent groups 53 of ejecting ports. When drawing circles with a radius of r, wherein r is a distance from the center of the ejecting port 52A in the upstream row to the midpoint P, and with their centers at the ejecting ports 52A in the upstream row and 52B in the intermediate stream of each group 53 of ejecting ports, since all the circles are the same in radius r, the pressures of the molten solder J flowing from each ejecting port 52A and 52B are the same at the point of radius r, and the flow of molten solder J is not generated at the midpoint P. The pressure of the molten solder J at the midpoint Q is, however, lower than that of the molten solder J at the point of radius r since the distances from each ejecting port 52A and 52B to the midpoint Q are longer than the radius r. Since molten solder J flows from the point where its pressure is higher to the point where its pressure is lower, various flows K of molten solder J are generated, as a result of which wall of an apparent slot is formed in the direction along the inclined line L in which each ejecting port 52A, 52B is formed and an apparent slot S (the hatched portion of FIG. 1) is formed at the portion where no circle with a radius of r is drawn. Under such conditions, when the substrate P is conveyed in the substrate-conveying direction A, molten solder J ejected is pushed by the substrate P and flows along the apparent slot S in the direction N. This is true of molten solder J flowing from each of the ejecting port 52 in the intermediate row and the ejecting port 52C in the downstream row of each group 53 of ejecting ports, and the molten solder J flows along the apparent slot S in the direction N. Molten solder J in the vicinity of the upstream end portion of the corrugated plate 51, however, flows in the direction opposite to N due to the pressure from the adjacent ejecting ports A toward the upstream.

Accordingly, when the substrate P is conveyed to the position where it is fed with molten solder J, even if gas of vaporized flux is generated or air is admixed, the gas generated or the air admixed under the bottom surface of the substrate P is satisfactorily discharged along the above described flow N to the outside, which means no occurrence of poor wetting. The larger the first prescribed pitch becomes compared with the second prescribed pitch, the more effective the creation of the flow of molten solder J becomes.

Thus, the flow N of molten solder J passing through the intermediate portion between the groups 53 of ejecting ports is created positively; therefore when the substrate P is conveyed to the position where it is fed with molten solder J, even if gas of vaporized flux is generated or air is admixed, the gas generated or the air admixed under the bottom surface (the surface subjected to soldering) of the substrate P is satisfactorily discharged along the above described flow N to the outside. In addition, since the relative velocity between the substrate P and molten solder J is enhanced, wetting of the substrate P and molten solder J is promoted. Accordingly, molten solder J satisfactorily comes in contact with all portions of the substrate P surface and the electronic parts which are subjected to soldering, which enables the prevention of poor wetting and the achievement of good soldering.

Although a jet solder feeding device has been described in the above embodiment in which a corrugated plate 51 having ejecting ports 52 formed thereon is arranged horizontally to the substrate-conveying direction A, there is an alternative in which a corrugated plate 51 having ejecting ports 52 formed thereon is inclined relative to the substrate-conveying direction A in such a manner that it goes up toward the downstream side of the substrate-conveying direction A. In this case, an increased amount of molten solder J flows toward the upstream side of the substrate-conveying direction A by its self-weight.

Figure 2A:
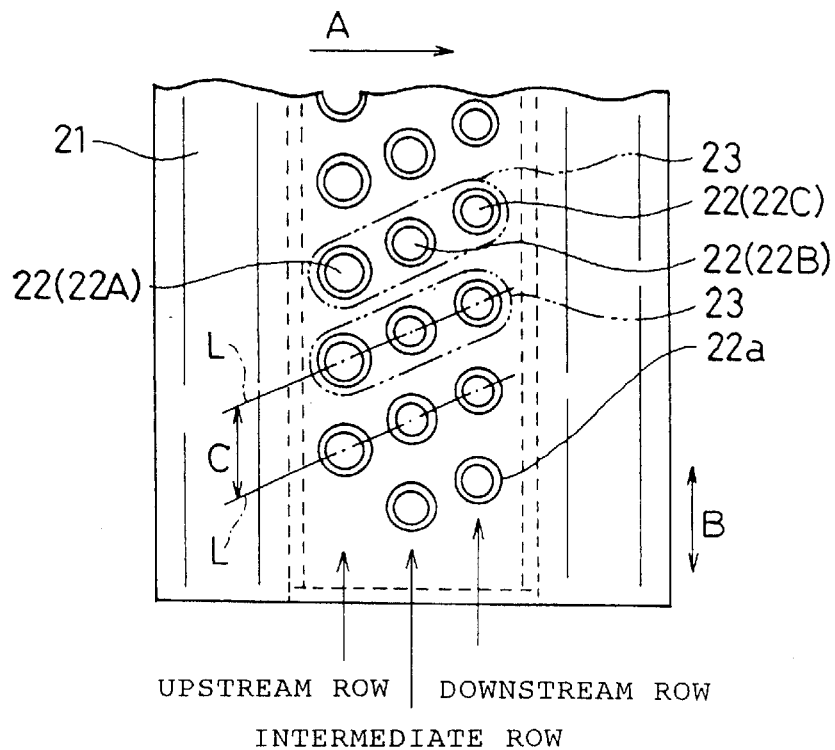
FIGS. 2a and 2b are views in top and in front elevation in section, respectively, partly broken away to show the main part of a jet solder feeding device according to a second embodiment of the present invention.
Figure 2B:
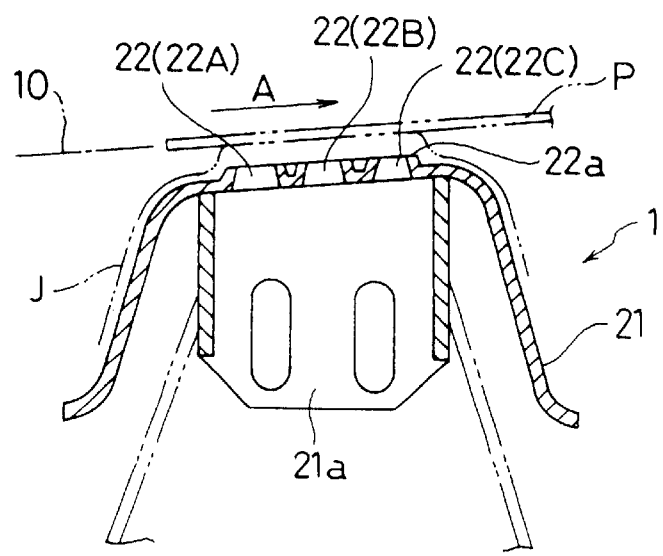

Referring now to FIGS. 2a and 2b, there is shown a top view, partly broken away, of the main part of a jet solder feeding device according to the second embodiment of the present invention, the jet solder feeding device including a corrugated plate 21 mounted on the upper end portion of a first jet nozzle 1 which has multiple ejecting ports 22 formed thereon. In the figure, 21a denotes a mounting plate portion through which the corrugated plate 21 is mounted on the first jet nozzle 1.

These ejecting ports 22 are arranged in three rows relative to the direction A in which the substrate P is conveyed: an upstream row of ejecting ports 22A, an intermediate row of ejecting ports 22B and a downstream row of ejecting ports 22C. The direction A in which the substrate P is conveyed (a substrate-conveying path 10) is inclined in such a manner that it goes up toward the downstream side of the substrate-conveying direction A. Corresponding to this incline, the portion of the corrugated plate 21 where ejecting ports 22 are provided is also inclined relative to the direction A in such a manner that it goes up toward the downstream side of the substrate-conveying direction A.

Figure 3:
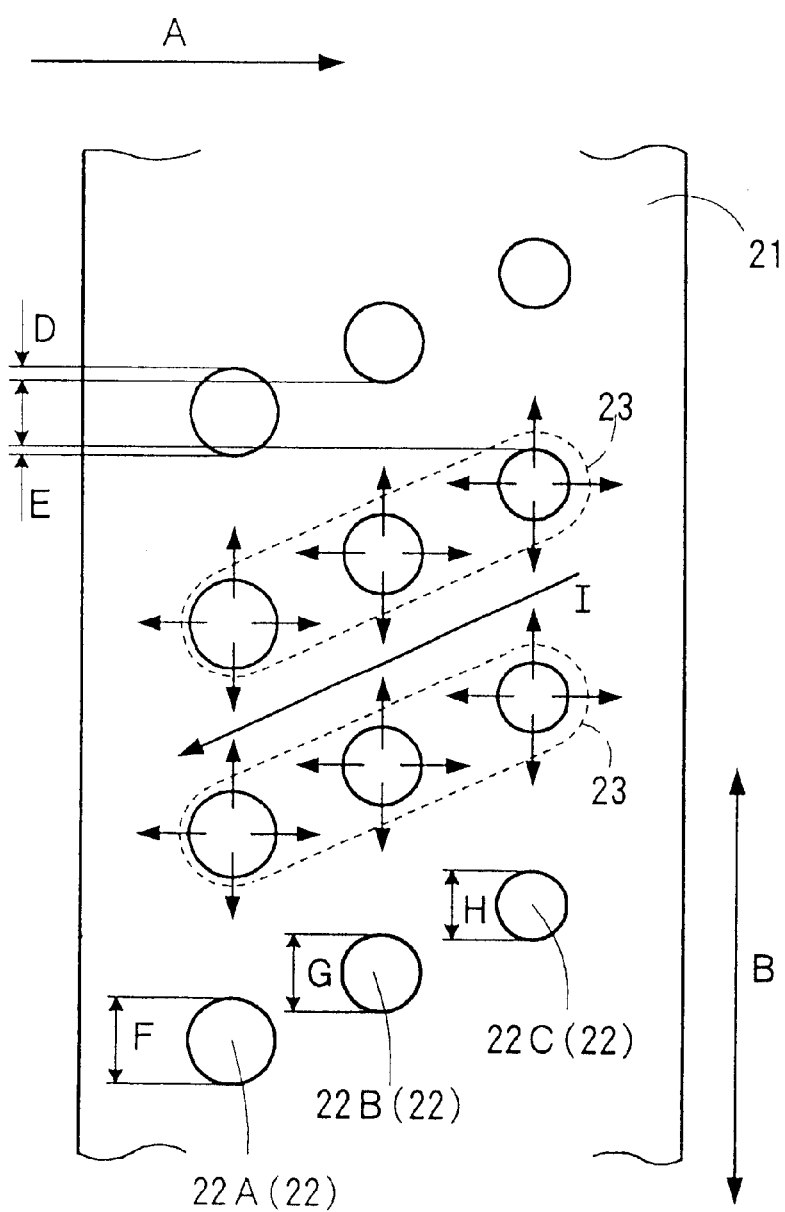
FIG. 3 is an enlarged top view partly broken away to show the flow conditions of molten solder in the jet solder feeding device of FIG. 2, the visible outline of the portion having been subjected to coining being omitted to clarify the amount of overlapping.

The ejecting ports 22A, 22B and 22C are arranged in lines along multiple inclined lines L which are inclined at a prescribed angle to the substrate-conveying direction A and arranged at a prescribed pitch C relative to the direction B perpendicular to the substrate-conveying direction A. They are also arranged in such a manner that overlap dimensions E, relative to the direction B perpendicular to the substrate-conveying direction A, of the ejecting port 22A in the most upstream row and the ejecting port 22C in the most downstream row of the adjacent groups 23 of ejecting ports is smaller than overlap dimensions D, relative to the direction B perpendicular to the substrate-conveying direction A, of the adjacent ejecting ports 22A and 22B and the adjacent ejecting ports 22B and 22C of a group 23 of ejecting ports arranged along the same inclined line L, as shown in FIG. 3.

Each of the ejecting ports 22 is in the form of round hole, and their bore diameters are set in such a manner that the bore diameter G of the ejecting ports 22B in the intermediate row is smaller than the bore diameter F of the ejecting ports 22A in the upstream row and the bore diameter H of the ejecting ports 22C in the downstream row is smaller than the bore diameter G.

As shown in FIGS. 2a and 2b, each wall portion 22a surrounding each ejecting port 22 on the corrugated plate 21 is designed to project upward, and these wall portions 22a are formed, for example, by coining.

According to the above described configuration, the spacing between the adjacent groups 23 of ejecting ports is larger than the spacing between the adjacent ejecting ports 22 of a group 23 of ejecting ports, and the balance of the flowing force of molten solder J from each ejecting port 22 is lost between the midpoint between the adjacent groups 23 of ejecting ports and the midpoint between the adjacent ejecting ports 22 of a group 23 of ejecting ports. As a result, molten solder J flows from the point where its flowing force is larger to the point where its flowing force is smaller. Accordingly, as shown in FIG. 3, the flow I of molten solder J passing through the midway portion between the adjacent groups 23 of ejecting ports is created positively; therefore when the substrate P is conveyed to the position where it is fed with molten solder J, even if gas of vaporized flux is generated or air is admixed, the gas or the air under the bottom surface (the surface subjected to soldering) of the substrate P is satisfactorily discharged along the above described flow I to the outside.

Further, in the corrugated plate 21, since the portion where multiple ejecting ports 22 are provided is inclined relative to the substrate-conveying direction A in such a manner that it goes up toward the downstream side of the above direction A, molten solder ejected from the ejecting ports 22 flows down toward the upstream side of the substrate-conveying direction A, which leads to a stronger flow I. Thus the gas generated or the air admixed under the bottom surface (the surface subjected to soldering) of the substrate P is satisfactorily discharged along the above described flow I to the outside, and in addition, since the relative velocity between the substrate P and molten solder J is enhanced, wetting of the substrate P and molten solder J is promoted.

Accordingly, molten solder J satisfactorily comes in contact with all portions of the substrate P surface and the electronic part which are subjected to soldering, which enables the prevention of poor wetting and the achievement of good soldering.

Further, since the bore diameter of each ejecting port 22 is set in such a manner that the ejecting port located nearer to the downstream side of the substrate-conveying direction has a smaller bore diameter, the amount of the molten solder J ejected from the ejecting port located nearer to the downstream side of the substrate-conveying direction becomes smaller. This can prevent the piles of the molten solder J ejected from the ejecting ports 22B in the intermediate row and from the ejecting ports 22A in the upstream row from being leveled by the flow of the molten solder J ejected from the ejecting ports 22C in the downstream row, when the molten solder J ejected from the ejecting ports 22C flows down along the corrugated plate 21. This can also prevent the piles of molten solder J ejected from the ejecting ports 22A in the upstream row from being leveled by the flow of the molten solder J ejected from the ejecting ports 22B in the intermediate row, when molten solder J ejected from the ejecting ports 22B flows down along the corrugated plate 21. Accordingly, not only the pile of molten solder J ejected from the ejecting ports 22C in the downstream row, but also the piles of molten solder J ejected from the ejecting ports 22B in the intermediate row and from the ejecting ports 22A in the upstream row can be kept at a desired height. As a result, even when the substrate warps to some degree due to the heating by molten solder J, molten solder J ejected from each ejecting port 22 satisfactorily comes in contact with all portions of the substrate P surface and the electronic part which are subjected to soldering, which enables the prevention of poor wetting.

Further, since each of the wall portions 22a surrounding each ejecting port 22 on the corrugated plate 21 is designed to project upward, the molten solder ejected from each ejecting port 22 can be obtained at a desired height, this also allows molten solder J ejected from each ejecting port 22 to satisfactorily come in contact with all portions subjected to soldering, which enables the prevention of poor wetting.

In the jet solder feeding devices where the direction A in which the substrate P is conveyed and the portion of the corrugated plate 21 in which ejecting ports 22 are formed are inclined in an upgrade manner toward the down stream side of the substrate-conveying direction A, gas and air easily escape. Accordingly, even when the substrate P has a surface with great unevenness due to the mixed mounting of surface mounted parts in addition to discrete parts (parts with lead legs), molten solder J satisfactorily comes in contact with the surface, even with the corners of the unevenness. Thus, these jet solder feeding devices are especially suitable for such a substrate.

Figure 4A:
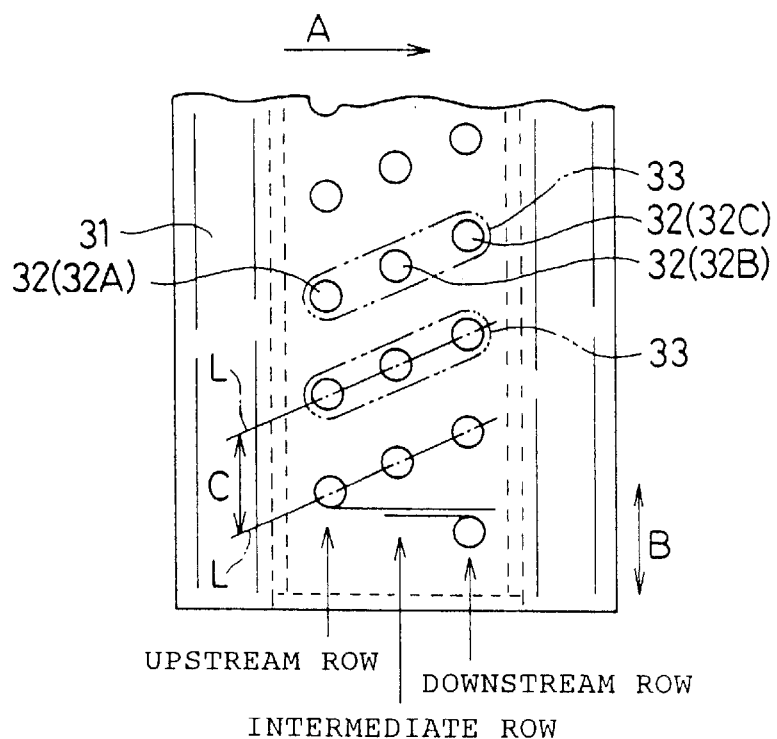
FIGS. 4a and 4b are views in top and in front elevation in section, respectively, partly broken away to show the main part of a jet solder feeding device according to a third embodiment of the present invention.
Figure 4B:
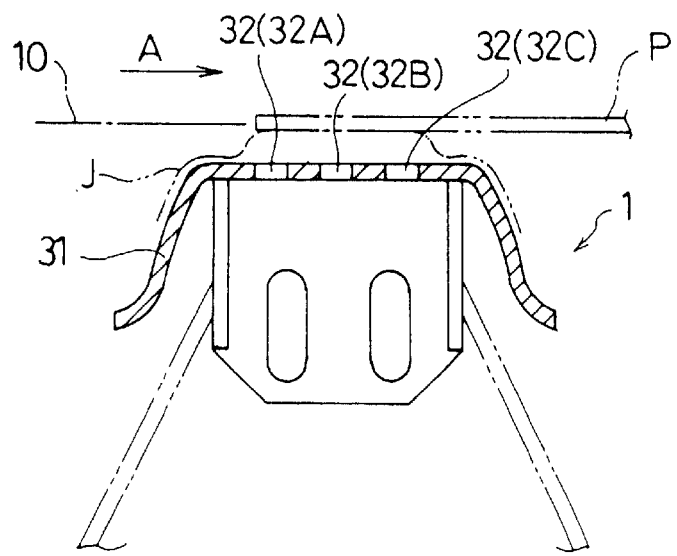

Referring now to FIGS. 4a and 4b, there is shown a top view, partly broken away, of the main part of a jet solder feeding device according to the third embodiment of the present invention. In this embodiment, the jet solder feeding device is designed in such a manner that the direction in which a substrate P is conveyed is substantially horizontal. According to this, the portions of a corrugated plate 31 mounted on a first jet nozzle 1 of the jet solder feeding device in which ejecting ports 32 are provided are also arranged substantially horizontally to the substrate-conveying direction A.

Like the above described embodiments, multiple ejecting ports 32 provided on a corrugated plate 31 are arranged in three rows relative to the direction A in which the substrate P is conveyed: an upstream row of ejecting ports 32A, an intermediate row of ejecting ports 32B and a downstream row of ejecting ports 32C.

The ejecting ports 32A, 32B and 32C are arranged in lines along multiple inclined lines L which are inclined at a prescribed angle to the substrate-conveying direction A and arranged at a prescribed pitch C relative to the direction B perpendicular to the substrate-conveying direction A. They are also arranged in such a manner that the ejecting port 32A in the most upstream row and the ejecting port 32C in the most downstream row of the adjacent groups 33 of ejecting ports do not overlap each other relative to the direction B perpendicular to the substrate-conveying direction A.

Each of the ejecting ports 32 is in the form of round hole, and the bore diameters of the ejecting ports 32A, 32B and 32C in each row are set to be substantially the same. And each of the wall portions surrounding each ejecting port 32 on the corrugated plate 31 is designed to be flat, and these wall portions are not subjected to coining.

Figure 5:
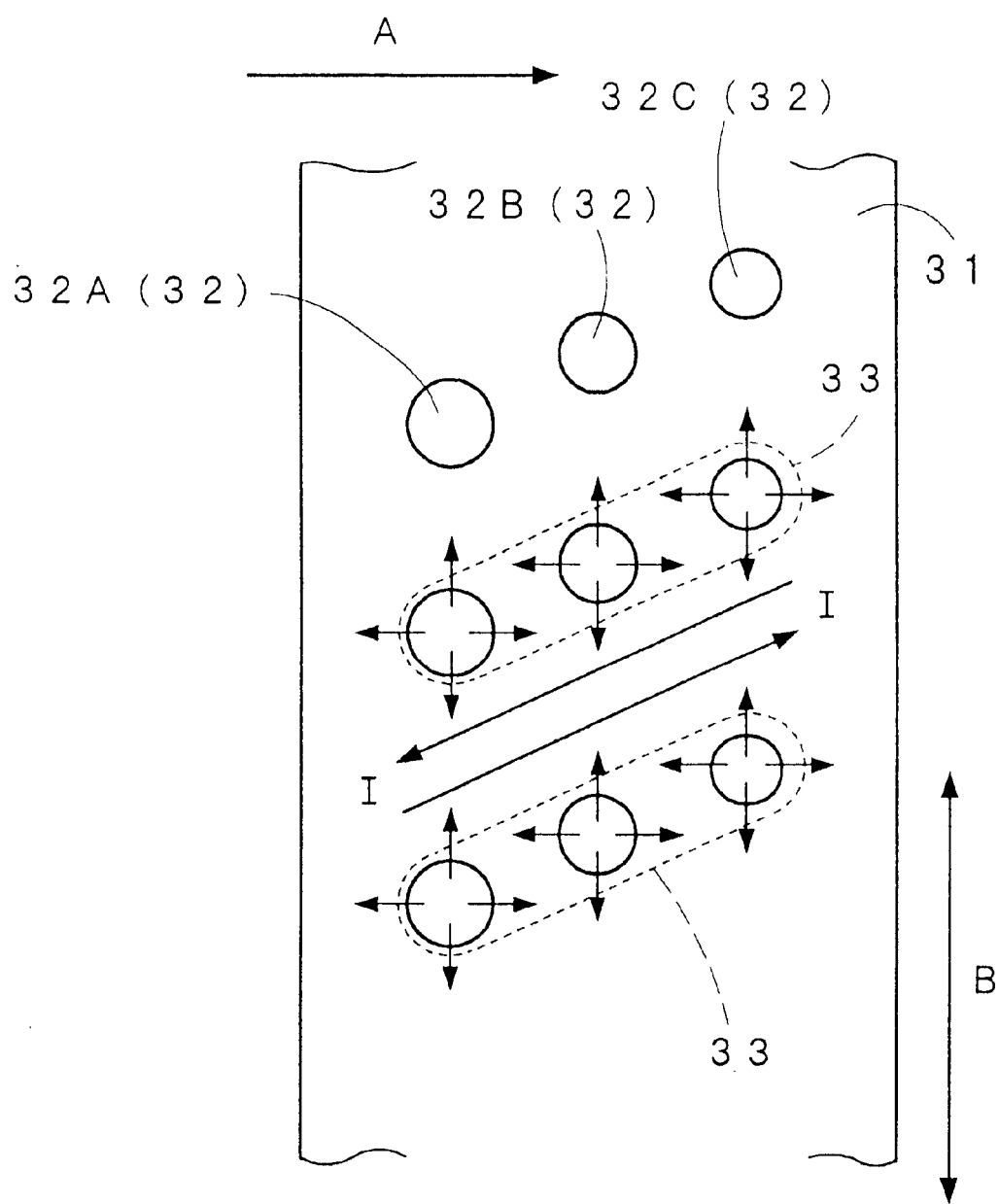
FIG. 5 is an enlarged top view partly broken away to show the flow conditions of molten solder in the jet solder feeding device of FIG. 4.
Figure 6:
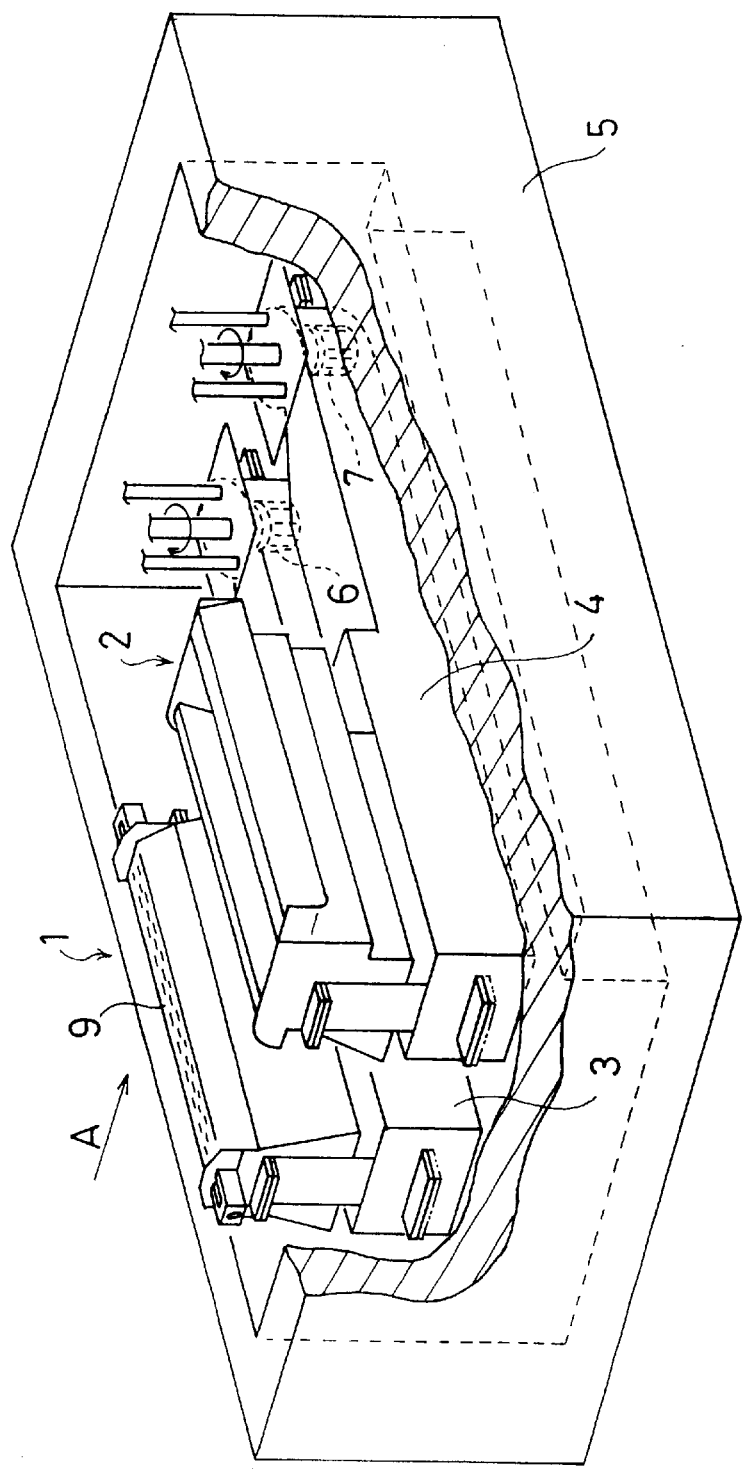
FIG. 6 is a schematic view in perspective of a jet solder feeding device.
Figure 7:
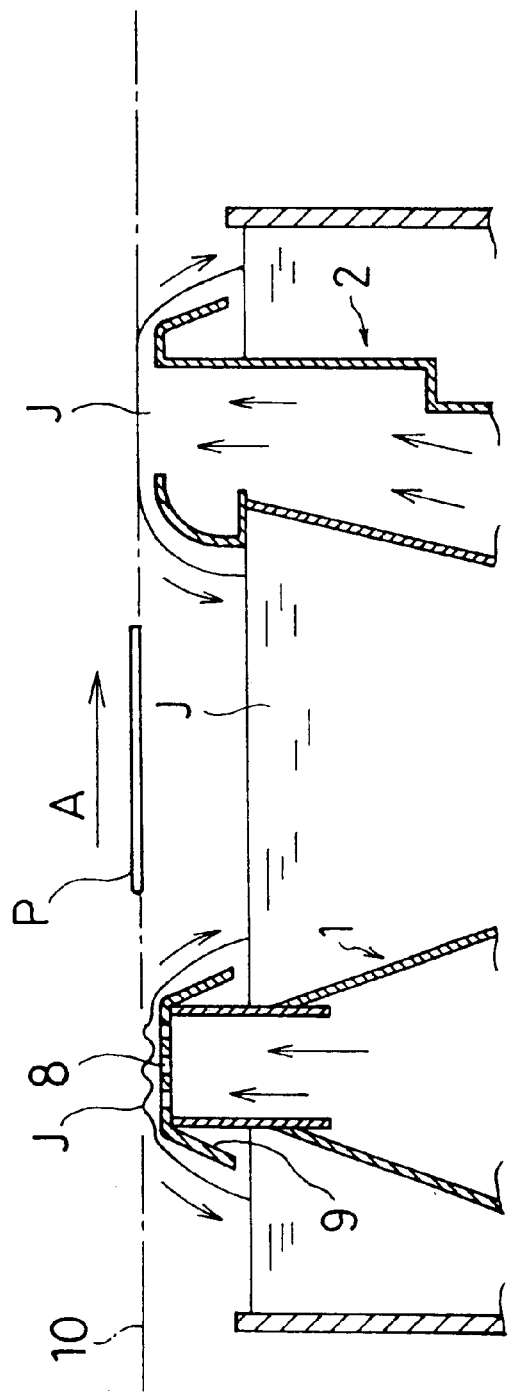
FIG. 7 is a schematic elevational view in section of a jet solder feeding device.
Figure 8A:
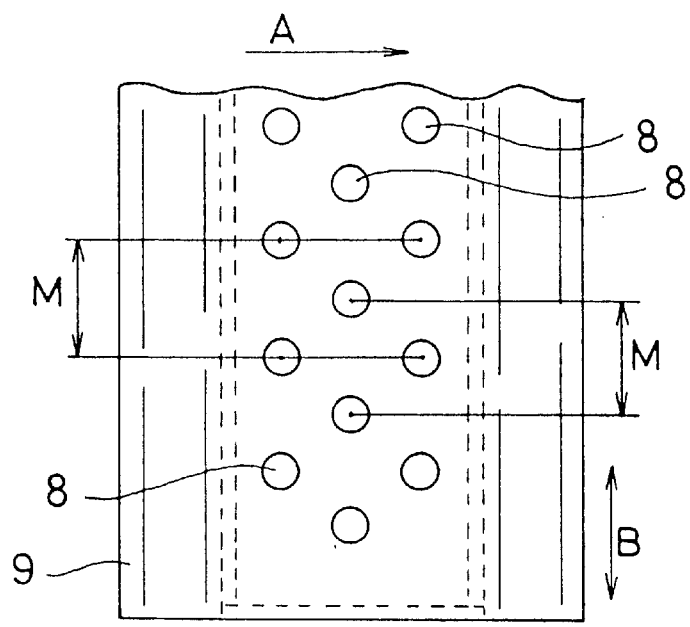
FIGS. 8a and 8b are views in top and in front elevation in section, respectively, partly broken away to show the main part of a jet solder feeding device according to a prior art.
Figure 8B:
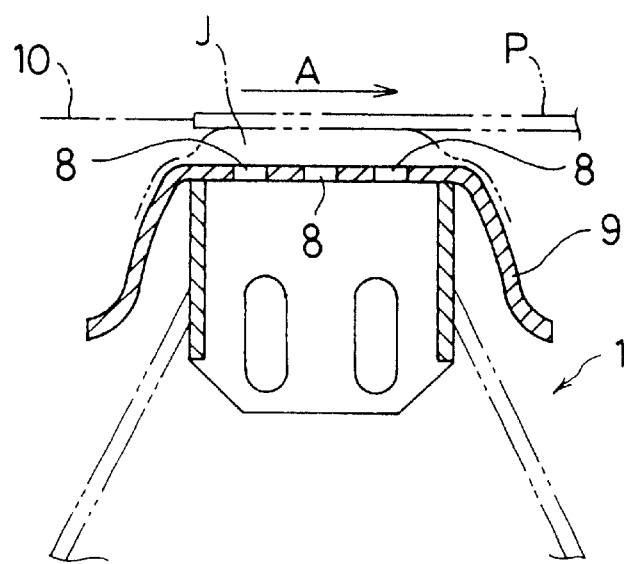
Figure 9:
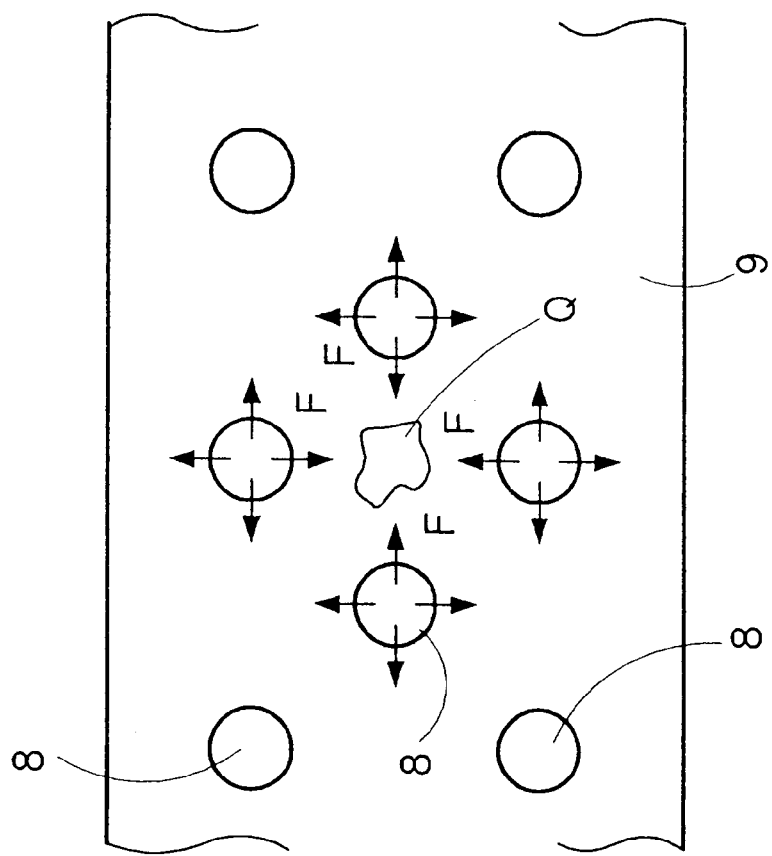
FIG. 9 is an enlarged top view partly broken away to show the flow conditions of molten solder in the jet solder feeding device of FIG. 8.

According to this configuration, the spacing between the adjacent groups 33 of ejecting ports is larger than the spacing between the adjacent ejecting ports 32 of a group 33 of ejecting ports, and the balance of the flowing force of molten solder J from each ejecting port 32 is lost between the midpoint of the adjacent groups 33 of ejecting ports and the midpoint of the adjacent ejecting ports 32 of a group 33 of ejecting ports. As a result, molten solder J flows from the point where its flowing force is larger to the point where its flowing force is smaller. Accordingly, as shown in FIG. 5, the flow I of molten solder J passing through the midway portion between the adjacent groups 33 of ejecting ports is created positively; therefore when the substrate P is conveyed to the position where it is fed with molten solder J, even if gas of vaporized flux is generated or air is admixed, the gas generated or the air admixed under the bottom surface (the surface subjected to soldering) of the substrate P is satisfactorily discharged along the above described flow I to the outside. Thus, molten solder J satisfactorily comes in contact with all portions of the surface of the substrate P and the electronic parts which are subjected to soldering, which enables the prevention of poor wetting and the achievement of good soldering.

The jet solder feeding devices where the direction A in which the substrate P is conveyed and the portion of the corrugated plate 31 in which ejecting ports 32 are formed is arranged horizontally, as described above, are suitable for substrates such that they are mounted with discrete parts, have less unevenness and include through holes into which lead legs are inserted. Although a jet solder feeding device has been described in this embodiment in which a corrugated plate 31 having ejecting ports 32 formed thereon is arranged horizontally to the substrate-conveying direction A, there is an alternative in which a corrugated plate 31 having ejecting ports 32 formed thereon is inclined relative to the substrate-conveying direction A in an upgrade manner toward the downstream side of the substrate-conveying direction A. In this case, too, an increased amount of molten solder J flows toward the upstream side of the substrate-conveying direction A by its self-weight.

Although the jet solder feeding devices in which the ejecting ports 22 and 32 are arranged in three rows relative to the substrate-conveying direction A have been described in the above embodiments, it goes without saying that the present invention can be applied to the jet solder feeding devices in which ejecting ports are arranged in 2 rows or 4 or more rows. And the shape of the ejecting ports 22 and 33 is not limited to round hole, various shapes such as polygonal, square or rectangular shape may also be adopted. Further, it goes without saying that, if the above structure involving ejecting ports is provided for only part of jet nozzles, the above effect can be obtained right on the part. The present invention is particularly suitable for the solder materials such as tin-copper based solder which contains no lead; however, it is natural that the present invention is applicable to various types solder such as conventional lead-containing solder and the other solder without lead.

As described above, according to the present invention, multiple ejecting ports for ejecting molten solder are provided in more than one rows, including an upstream row and a downstream row, and arranged at a second prescribed pitch in lines along multiple inclined lines which are inclined to the substrate-conveying direction and arranged at a first prescribed pitch in the direction perpendicular to the substrate-conveying direction, wherein the first prescribed pitch is set to be larger than the second prescribed pitch. As a result, the balance of the flow force of molten solder ejected from each ejecting portion is lost, molten solder flows from the points where its flow force is larger to the points where its flow force is smaller; accordingly, when a substrate is conveyed to the point where it is fed with molten solder, even if gas of vaporized flux is generated or air is admix, the gas generated and air admixed under the bottom surface of the substrate is satisfactorily discharged along the above described flow to the outside. This allows the molten solder to satisfactorily come in contact with all portions of the surface of the substrate and the electronic part which are subjected to soldering, which enables the prevention of poor wetting and the achievement of good soldering.

Alternatively, multiple ejecting ports are arranged in such a manner that the overlap dimensions relative to the direction perpendicular to the substrate-conveying direction of an ejecting port in the most upstream row and an ejecting port in the most downstream row of the adjacent groups of ejecting ports are smaller than the overlap dimensions of the adjacent ejecting ports of a group of ejecting portions arranged along the same inclined line. And alternatively, multiple ejecting ports are arranged in such a manner that an ejecting port in the most upstream row and an ejecting port in the most downstream row of the adjacent groups of ejecting ports do not overlap each other relative to the direction perpendicular to the substrate-conveying direction. Thus, when a substrate is conveyed to the point where it is fed with molten solder, even if gas of vaporized flux is generated or air is admix, the gas generated and air admixed under the bottom surface of the substrate is satisfactorily discharged along the above described flow to the outside. This allows the molten solder to satisfactorily come in contact with all portions of the surface of the substrate and the electronic part which are subjected to soldering, which enables the prevention of poor wetting and the achievement of good soldering.

What is claimed is:

1. A jet solder feeding device for feeding molten solder to a substrate conveyed in a prescribed conveying direction by ejecting the molten solder from multiple ejecting ports toward the substrate, wherein, in at least one part of the area including said multiple ejecting ports, the ejecting ports are provided in more than one rows relative to the substrate-conveying direction, including an upstream row and a downstream row and arranged at a second prescribed pitch in lines substantially along multiple inclined lines which are inclined to the substrate-conveying direction, and being arranged at a first prescribed pitch in the direction perpendicular to the substrate-conveying direction, said first prescribed pitch being set to be larger than said second prescribed pitch.

2. A jet solder feeding device for feeding molten solder to a substrate conveyed in a prescribed conveying direction by ejecting the molten solder from multiple ejecting ports toward the substrate, wherein, in at least one part of the area including said multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch in the direction perpendicular to the substrate-conveying direction, said ejecting ports further being arranged in such a manner that overlap dimensions relative to the direction perpendicular to the substrate-conveying direction of an ejecting port in the most upstream row and an ejecting port in the most downstream row of adjacent groups of ejecting ports are smaller than overlap dimensions relative to the direction perpendicular to the substrate-conveying direction of adjacent ejecting ports of one group of ejecting ports arranged along the same inclined line.

3. A jet solder feeding device for feeding molten solder to a substrate conveyed in a prescribed conveying direction by ejecting the molten solder from multiple ejecting ports toward the substrate, wherein, in at least one part of the area including said multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch in the direction perpendicular to the substrate-conveying direction, said ejecting ports further being arranged in such a manner that an ejecting port in the most upstream row and an ejecting port in the most downstream row of adjacent groups of ejecting ports do not overlap each other relative to the direction perpendicular to the substrate-conveying direction.

4. The jet solder feeding device according to claim 1, wherein the jet solder feeding device including a first jet nozzle for feeding molten solder to the substrate and a second jet nozzle for removing excess solder from the substrate having been fed with solder, the ejecting ports being provided on the first jet nozzle.

5. The jet solder feeding device according to claim 1, wherein the portion provided with more than one rows of ejecting ports is arranged horizontally to the substrate-conveying direction.

6. The jet solder feeding device according to claim 1, wherein the portion provided with more than one rows of ejecting ports is inclined relative to the substrate-conveying direction in an upgrade manner toward the downstream side of the above direction.

7. The jet solder feeding device according to claim 6, wherein the substrate is conveyed in a prescribed upgrade conveying direction and each ejecting port has a smaller bore diameter according as it is located nearer to the downstream side of the substrate-conveying direction.

8. The jet solder feeding device according to claim 1, wherein the jet solder feeding device comprises a corrugated plate, multiple ejecting ports being formed thereon, each of the ejecting ports on the corrugated plate being surrounded by a wall portion projecting upward.

9. A method for soldering a substrate conveyed in a prescribed conveying direction by ejecting molten solder from multiple ejecting ports toward the substrate to feed the molten solder thereto, wherein, in at least one part of the area including said multiple ejecting ports, the ejecting ports are provided in more than one rows relative to the substrate-conveying direction, including an upstream row and a downstream row and arranged at a second prescribed pitch in lines substantially along multiple inclined lines which are inclined to the substrate-conveying direction, and being arranged at a first prescribed pitch relative to the direction perpendicular to the substrate-conveying direction, said first prescribed pitch being set to be larger than said second prescribed pitch, whereby soldering is carried out for the portion to be connected arranged on the substrate with the molten solder ejected from said multiple ejecting ports.

10. A method for soldering a substrate conveyed in a prescribed conveying direction by ejecting molten solder from multiple ejecting ports toward the substrate to feed the molten solder to the substrate, wherein, in at least one part of the area including said multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed-pitch relative to the direction perpendicular to the substrate-conveying direction, said ejecting ports further being arranged in such a manner that overlap dimensions relative to the direction perpendicular to the substrate-conveying direction of an ejecting port in the most upstream row and an ejecting port in the most downstream row of adjacent groups of ejecting ports are smaller than overlap dimensions relative to the direction perpendicular to the substrate-conveying direction of adjacent ejecting ports of one group of ejecting ports arranged along the same inclined line, whereby soldering is carried out for the portion to be connected arranged on the substrate with the molten solder ejected from said multiple ejecting ports.

11. A method for soldering a substrate conveyed in a prescribed conveying direction by ejecting molten solder from multiple ejecting ports toward the substrate to feed the molten solder to the substrate, wherein, in at least one part of the area including said multiple ejecting ports, the ejecting ports are provided in more than one rows relative to the substrate-conveying direction, including an upstream row and a downstream row and arranged in lines substantially along multiple inclined lines which are inclined to the substrate-conveying direction, and being arranged at a prescribed pitch relative to the direction perpendicular to the substrate-conveying direction, said ejecting ports further being arranged in such a manner that an ejecting port in the most upstream row and an ejecting port in the most downstream row of adjacent groups of ejecting ports do not overlap each other relative to the direction perpendicular to the substrate-conveying direction, whereby soldering is carried out for the portion to be connected arranged on the substrate with the molten solder ejected from said multiple ejecting ports.

\* \* \* \* \*